(12) United States Patent
Wecker et al.

(10) Patent No.: US 11,692,602 B2
(45) Date of Patent: Jul. 4, 2023

(54) BRAKE DEVICE FOR A MOTOR VEHICLE WITH A RESET DEVICE

(71) Applicant: ZF Active Safety GmbH, Koblenz (DE)

(72) Inventors: Paul Wecker, Limburg (DE); Marco Becker, Oberdürenbach (DE); Guido Zenzen, Macken (DE); Lukas Madzgalla, Lahnstein (DE); Joerg Knieper, Vallendar (DE); Florian Roessinger, Neuwied (DE); Peter Mäurer, Koblenz (DE); Philipp Schwenzer, Urmitz (DE)

(73) Assignee: ZF Active Safety GmbH, Koblenz (DE)

( * ) Notice: Subject to any disclaimer, the term of this patent is extended or adjusted under 35 U.S.C. 154(b) by 256 days.

(21) Appl. No.: 16/927,049

(22) Filed: Jul. 13, 2020

(65) Prior Publication Data

US 2021/0010554 A1 Jan. 14, 2021

(30) Foreign Application Priority Data

Jul. 12, 2019 (DE) .......................... 102019210316.2

(51) Int. Cl.
*F16D 65/56* (2006.01)
*F16D 65/00* (2006.01)

(52) U.S. Cl.
CPC ....... *F16D 65/567* (2013.01); *F16D 65/0056* (2013.01)

(58) Field of Classification Search
CPC ...... F16D 65/567; F16D 65/18; F16D 65/183; F16D 2125/582; F16D 2055/0041; F16D 65/52; F16D 2065/1396
See application file for complete search history.

(56) References Cited

U.S. PATENT DOCUMENTS

| 7,040,464 | B1 * | 5/2006 | Andrews | F16D 65/0977 188/73.38 |
| 7,318,503 | B2 * | 1/2008 | Farooq | F16D 65/0974 188/73.31 |
| 2004/0222053 | A1 * | 11/2004 | Wemple | F16D 65/0977 188/73.38 |
| 2015/0001011 | A1 * | 1/2015 | Zhang | F16D 65/12 188/72.3 |
| 2017/0307033 | A1 * | 10/2017 | Toguri | F16D 65/097 |

(Continued)

FOREIGN PATENT DOCUMENTS

| CN | 10271330 | B | * | 3/2015 | |
| CN | 108291597 | A | * | 7/2018 | ............. B60T 1/065 |
| DE | 2611432 | A1 | | 9/1977 | |

(Continued)

*Primary Examiner* — Robert A. Siconolfi
*Assistant Examiner* — Mahbubur Rashid
(74) *Attorney, Agent, or Firm* — Robert James Harwood

(57) ABSTRACT

Brake apparatus for a motor vehicle with a restoring apparatus, comprising a brake support body, a brake lining, a restoring apparatus for the brake lining, and a wear compensation means, the restoring apparatus being connected via the wear compensation means to the brake lining, the restoring apparatus having a lever arm which comprises a spring section, a supporting bearing and a lever bearing, the lever bearing being arranged between the spring section and the supporting bearing.

11 Claims, 10 Drawing Sheets

(56) References Cited

U.S. PATENT DOCUMENTS

2018/0274611 A1* 9/2018 Song ................... F16D 65/0972
2019/0203788 A1* 7/2019 Sekiguchi ............. F16D 55/226

FOREIGN PATENT DOCUMENTS

| DE | 102009022633 A1 | | 10/2010 | |
|----|----|----|----|----|
| DE | 102012011233 A1 | * | 12/2013 | ........... F16D 65/092 |
| DE | 102013207424 A1 | | 10/2014 | |
| DE | 102013016779 A1 | | 4/2015 | |
| DE | 102015122563 A1 | * | 6/2017 | ........... F16D 55/225 |
| DE | 102016202520 A1 | * | 8/2017 | ........... F16D 55/226 |
| DE | 102016211147 A1 | * | 12/2017 | ........... F16D 65/097 |
| DE | 102017007259 A1 | | 2/2019 | |
| DE | 102019205500 A1 | * | 10/2020 | ......... F16D 65/0979 |
| DE | 102019212896 A1 | * | 10/2020 | ......... F16D 65/0979 |
| EP | 2557330 A1 | | 2/2013 | |
| GB | 2147069 A | * | 5/1985 | ......... F16D 65/0973 |
| JP | H0587166 A | * | 4/1993 | |
| JP | 2018508725 A | * | 3/2018 | ........... F16D 65/092 |
| WO | 2013182606 A1 | | 12/2013 | |

* cited by examiner

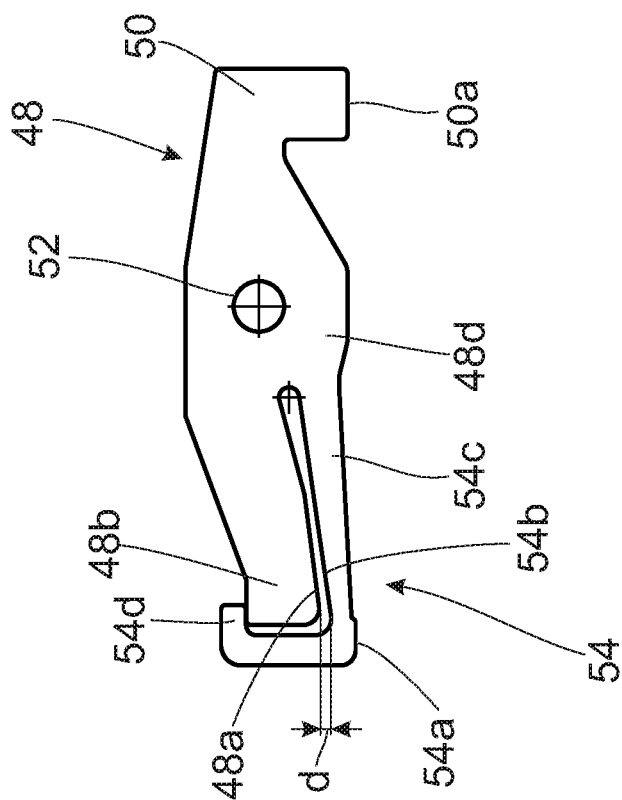
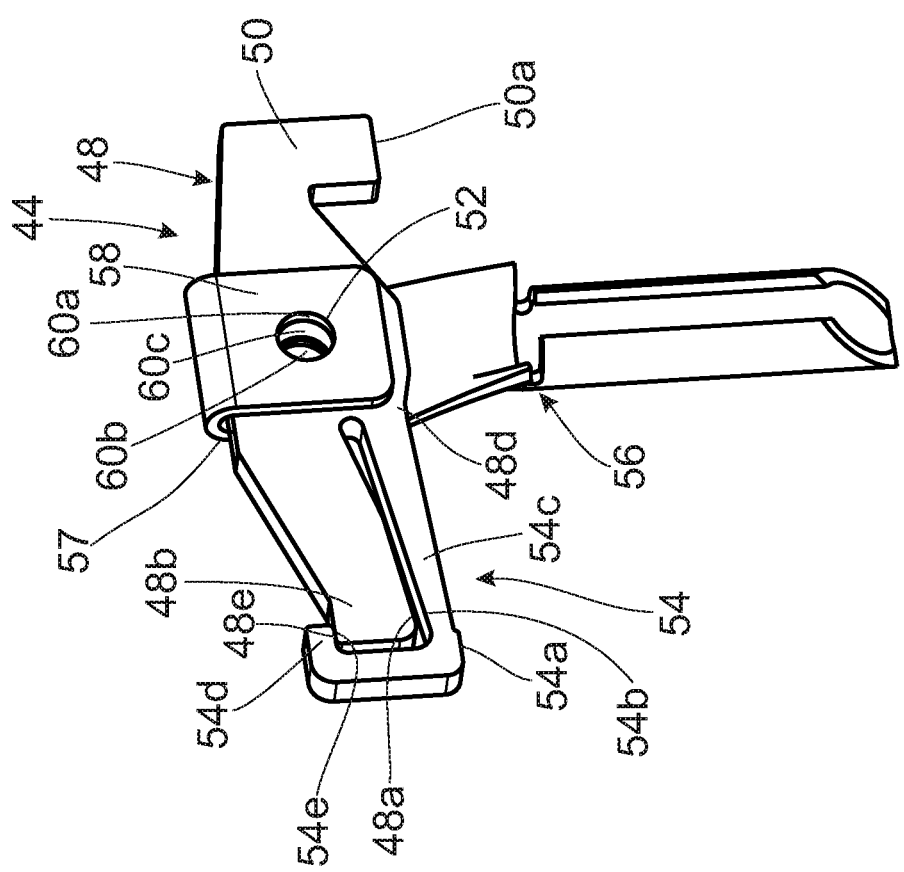
Fig. 9
Fig. 10

BRAKE DEVICE FOR A MOTOR VEHICLE WITH A RESET DEVICE

CROSS-REFERENCE TO RELATED APPLICATION

This application claims priority to German Patent Application No. 102019210316.2 filed Jul. 12, 2019, the disclosure of which is incorporated herein by reference in its entirety.

TECHNICAL FIELD

The present disclosure relates to a brake apparatus for a motor vehicle with a restoring apparatus.

BACKGROUND

In the case of motor vehicles, it is becoming increasingly important to save energy. In the case of brake systems, in particular disk brakes, brake linings which drag on a brake disk lead to an undesired brake force. In addition, fine dust is produced by way of the dragging of the brake linings. In order to eliminate disadvantages of this type, restoring apparatuses are already known in the prior art. Said restoring apparatuses restore the brake linings after an actuating operation into a rest position. The restoring action usually takes place via a restoring force, an air gap being provided between the brake lining and a brake disk by way of the restoring action into the rest position. The air gap makes contact-free and therefore also friction-free and fine dust-free relative rotation of the brake disk with respect to the brake lining possible. Wear compensation means can also be configured on restoring apparatuses of this type, which wear compensation means adjusts the rest position even in the case of increasing wear of the brake linings, in such a way that the air gap always remains constant in the non-actuated state of the brake apparatus. Apparatuses of this type are also known in the prior art.

SUMMARY

It is therefore an object to provide a brake apparatus for a motor vehicle with a restoring apparatus, in the case of which the wear compensation means is enabled in a reliable and precise way even in the case of occurring wear.

Said object is achieved by way of a brake apparatus in accordance with the features of the current patent claim 1. Advantageous design variants are indicated in the dependent patent claims.

The brake apparatus is favorably configured as a disk brake, comprising a brake caliper and a brake disk. Here, the brake caliper is arranged on the motor vehicle and is connected to a body. The fastening takes place, for example, to an axle support. The brake disk is connected fixedly to a wheel of the motor vehicle so as to rotate with it, and carries out a common rotational movement with said wheel. In the case of a rotational movement of the wheel and therefore also of the brake disk, the brake disk and therefore also the wheel can be braked by way of an actuation of the brake caliper. The actuation of the brake caliper takes place by way of two brake linings which are arranged axially on both sides of the brake disk and are pressed axially onto the brake disk in order to provide a brake force.

A brake apparatus of this type is favorably configured as a floating caliper brake or else as a fixed caliper brake. A brake apparatus of this type is suitable, in particular, for motor vehicles, such as passenger cars, commercial vehicles or else motorcycles.

The brake apparatus comprises a brake support body, a brake lining and a restoring apparatus for the brake lining, and a wear compensation means. Furthermore, the brake apparatus advantageously has a brake actuator.

In the case of a floating caliper brake, the brake support body is configured as a brake carrier which receives a brake actuator. In the case of a fixed caliper brake, the brake support body is configured as a fixed caliper. Here, the fixed caliper can be of single-piece configuration as a monoblock or of multiple-piece configuration, for example by way of two fixed caliper halves. In particular, the brake support body is connected fixedly to the body, with the result that brake forces which are introduced can be transmitted to the body via the brake support body.

The brake support body is particularly advantageously configured by way of a brake carrier or a fixed caliper.

The brake lining is configured by way of a lining carrier and a friction lining, the lining carrier and the friction lining being connected fixedly to one another. The lining carrier serves to absorb the actuating force of the brake caliper, in particular of the brake actuator, which actuating force is introduced into the lining carrier. In addition, the lining carrier favorably provides a guide function of the brake lining with respect to the brake caliper. The guidance preferably takes place with respect to the brake support body, in particular via a lug/groove arrangement. The actuating force which is introduced is forwarded to the friction lining via the lining carrier. The friction lining provides a friction face which comes into bearing contact with a friction face of the brake disk. A brake torque is provided by way of the friction force which occurs between the friction faces. The forces which occur are supported by the brake linings via the brake support body.

The restoring apparatus is configured to move the brake lining back into a rest position after an actuating operation. The restoring action takes place via a restoring force which moves the restoring apparatus into the brake lining. A spring element or a spring section favorably provides a restoring force of this type. The restoring apparatus therefore ensures a restoring action of the brake lining into a rest position.

As the number of brake operations increases, however, the thickness of the friction linings decreases on account of the wear which occurs. The wear compensation means then ensures an adjustment, with the result that the basic position of the friction lining remains unchanged even for actuating operations which follow. Accordingly, the wear compensation means ensures that the rest position of the brake lining changes, in order to provide a consistent basic position. The basic position is defined by way of the spacing of the contact faces of the friction lining from the brake disk in the rest state, the wear of the disk brake being ignored in the case of said definition. The rest position is defined via the axial position of the lining carrier with respect to the brake disk, the lining carrier and therefore also the rest position moving axially toward the brake disk as the wear increases. Accordingly, the wear compensation means provides an adaptation of the relative position of the restoring apparatus and the lining carrier. As a result, a consistent basic position is provided even in the case of increasing wear of the friction lining. In particular, the spacing between the friction lining and the brake disk in the rest state remains unchanged over the service life of the brake linings.

Furthermore, the restoring apparatus is connected via the wear compensation means to the brake lining. The wear compensation means is favorably configured by way of a frictionally locking connection. In addition, the restoring apparatus advantageously has a lever arm.

The wear compensation means, in particular the frictionally locking connection, ensures a fixed connection of the restoring apparatus to the brake lining, in particular the lining carrier of the brake lining. As a result, a reliable transmission of the restoring force to the brake lining is provided.

The wear compensation means is provided, for example, by way of a connecting element of the restoring apparatus, in particular a pin, which connecting element engages into an opening of the lining carrier. Here, the connecting element and the opening are configured in such a way that a frictionally locking connection is provided which provides a fixed connection between the brake lining, in particular the lining carrier, and the restoring apparatus. The restoring apparatus is configured such that it is elastic to a limited extent by way of a stop. As a result of the elasticity, a restoring force is provided in the axial direction, which restoring force moves the brake lining into the rest position. The stop is configured in such a way that, in the case of a complete deflection of the restoring apparatus, bearing contact can take place between the brake lining and the disk brake.

If the axial movement of the brake lining exceeds the maximum possible spring travel of the restoring apparatus, the restoring apparatus blocks a further movement of the connecting element toward the brake disk, as a result of which the brake lining is moved or displaced axially with respect to the connecting element. Here, the actuating force of the brake actuator exceeds the static friction of the frictionally locking connection, that is to say the static friction between the connecting element and the opening. At the end of the braking operation, the restoring apparatus provides the same restoring travel to the rest position again starting from the stop.

As a result, the adjustment by way of the adjusting apparatus compensates for the wear which occurs of the friction lining. In the case of an adjusting operation of this type, the rest position of the friction lining changes, the basic position remaining substantially unchanged.

Furthermore, the restoring apparatus of the brake apparatus has a lever arm. Said lever arm comprises a spring section, a supporting bearing and a lever bearing. The lever arm is particularly advantageously configured as a sheet metal part.

The supporting bearing serves to support the restoring apparatus, in particular the lever arm, on the brake support body. In particular, the forces which are introduced to the lever arm act in the axial direction, that is to say toward the brake force carrier. The lever arm is accordingly restricted via the supporting bearing in terms of its axial movability with respect to the brake support body. The supporting bearing is favorably configured in one piece by way of the lever arm or is configured by way of a supporting bearing element which is connected fixedly to the lever arm.

The spring section provides a spring force which makes the restoring action of the brake lining possible. The spring section is likewise supported on the brake support body. The support takes place, in particular, in the axial direction. The spring section provides the spring travel which makes a return of the brake lining into the basic position possible. The spring section advantageously also configures a stop which limits the spring travel and activates the wear adjustment means. The spring section is preferably configured in one piece on the lever arm or is configured as a spring element which is connected fixedly to the lever arm.

The lever bearing provides support for the wear compensation means, in particular a connecting element of the wear compensation means. The connecting element is favorably fastened to the lever bearing or is configured in one piece with the lever arm on the lever bearing. The lever bearing ensures the introduction of force starting from the spring section into the brake lining. In addition, the force which acts on the brake lining is introduced at the lever bearing, which brake lining is then supported via the spring section and the supporting bearing on the brake support body. The lever bearing is also favorably configured in one piece with the lever arm or is configured by way of a lever bearing element which is fastened to the lever arm.

Furthermore, the lever bearing is arranged between the spring section and the supporting bearing.

As a result, the force between the supporting bearing and the spring section is introduced into the lever arm. The lever arm itself is favorably configured as a stable and rigid construction, with the result that it experiences substantially no deformation in the case of the forces which usually occur, in particular in the case of forces which act in the axial direction.

Therefore, along the extent of the lever arm, first of all the supporting bearing, the lever bearing adjacent thereto, and the spring section adjacent to the lever bearing are configured on said lever arm. The supporting bearing serves as a rotational point of the restoring apparatus. In other words, the lever arm rotates around the supporting bearing in the case of an actuation of the brake lining in the axial direction. Starting from the supporting bearing, the lever bearing and the spring section have lever lengths of different magnitude. The restoring force on the lever bearing can be set in a targeted manner by way of the ratio of the lever lengths, the spring force of the spring section and the spring travel of the spring section. On account of its higher rigidity, the lever arm provides substantially no spring force.

Advantageous design variants of the brake apparatus will be described in the further text.

The restoring apparatus particularly advantageously has a connecting element which engages via a pin into an opening of the friction lining and configures the frictionally locking connection as a result.

In particular, the wear compensation means is configured by way of a connecting element which engages into an opening in a frictionally locking manner. The opening is favorably configured through the lining carrier. The connecting element of the wear compensation means is preferably actuated via the lever bearing.

The connecting element can be configured, for example, by way of a pin which engages into the opening, in particular a bore of the friction lining, in particular of the lining carrier. The connecting element is, in particular, a hollow pin which has a slot. The slot is preferably configured parallel to the center axis of the hollow pin, with the result that the radial extent of the hollow pin can be compressed, in relation to the center axis. As a result, the hollow pin can engage into an opening which has a smaller diameter than the hollow pin itself. In the case of the insertion, the diameter of the hollow pin is compressed, with the result that said hollow pin becomes a type of spring element. As a result, in particular, the holding force of the frictionally locking connection can be set.

As an alternative, a pin can also be configured, in particular a solid pin, which engages into the opening of the lining carrier. Here, the opening of the friction lining is favorably slotted, with the result that the elasticity is configured by way of the lining carrier.

In particular, the opening, into which the connecting element engages, is configured on the guide lugs of the lining carrier. Said guide lugs serve to guide the brake lining with respect to the brake caliper. The connecting element is favorably configured in one piece with the restoring apparatus or is fastened to the restoring apparatus. The arrangement takes place on the lever bearing of the restoring apparatus.

The lever arm is particularly advantageously of flexurally stiff configuration.

In other words, in comparison with the spring section, the lever arm provides a negligible elasticity in the direction of the restoring force.

It is proposed that the supporting bearing has a supporting face which is in bearing contact with a supporting face of the brake support body.

The supporting face forms the rotational point of the lever arm. In particular, the supporting face is configured by way of the lever arm. By way of the configuration of the corresponding supporting faces, burrowing of the supporting bearing into the brake support body can be prevented. As a result, a basic position is provided which remains substantially unchanged over the entire service life. In addition, any surface unevennesses of the brake support body which is not machined at this point, which unevennesses can occur, for example, in the case of casting of the brake support body, are irrelevant as a result of the flat contact.

It is proposed that the contact section of the supporting bearing is of flat configuration.

The contact section is flat, in particular, when the width of the contact face is greater than the thickness of the sheet metal, from which the supporting bearing or the lever arm is configured.

Furthermore, it is proposed that the restoring apparatus is of two-piece configuration and has a connecting element which is fastened to the lever arm.

The connecting element preferably configures the pin or comprises a pin-shaped section. The connecting element is favorably arranged on and fastened to the lever arm on the lever bearing. The fastening can be configured, for example, by way of a riveted connection. In particular, the connecting element has a tab, with the result that the connecting element engages around the lever arm on both sides. As a result, an improved attachment and more reliable support of the connecting element are achieved. The connecting element is therefore guided via the rivet at two points, with the result that torsion forces which occur are supported in an improved manner.

The lever arm, the connecting element and also its tab have openings which correspond with one another and into which a fastening means, for example a rivet, can engage. The fastening means provides a fixed connection between the lever arm and the connecting element. In particular, the connecting element can rotate about the rivet with respect to the lever arm, and can compensate at least partially for the rotational movement of the lever arm with respect to the lining carrier.

The spring section is favorably arranged adjacently with respect to the lever bearing.

It is proposed that the spring section is configured on an end region of the lever arm or extends along the end region of the lever arm.

The end region described here of the lever arm is arranged on the lever arm so as to lie opposite the supporting bearing. The spring section advantageously extends, starting from the end region of the lever arm, or is configured on or fastened to the end region. The spring section is configured in one piece with the lever arm, or the spring section is configured by way of a spring element which is fastened to the lever arm. In another variant, the spring section extends along the end region of the lever arm. In particular, the spring section engages over or around the end region of the lever arm. In other words, the spring section of the lever arm extends beyond the main body of the lever arm and engages around the end region of the lever arm. Here, the spring section advantageously extends starting from a middle region of the lever arm, in which middle region the lever bearing is also arranged, or is fastened to the lever arm in said middle region. The spring section therefore favorably extends with a part section along the lever arm from the middle region to the end region of the lever arm and then engages around the latter, in order to be supported with an end section with respect to the end region of the lever arm.

The spring section particularly advantageously has a spring arm which provides a spring force for a restoring action of the brake lining.

Said spring arm is favorably in contact with the brake support body, with the result that the spring arm can be supported with respect to the brake support body. In addition, the spring arm is configured in such a way that the spring action is limited by way of a stop after a predefined spring travel. The provided maximum spring travel defines the spacing of the friction lining from the brake disk and therefore the restoring travel of the brake lining.

In one advantageous design variant, the spring section, in particular the spring arm, is prestressed.

Said prestress takes place, for example, via an end section of the spring arm, which end section is supported with respect to the lever arm. In one design variant, the support can also take place on the spring section itself. By way of the prestress of the spring arm or the spring section, the restoring force is increased and, in addition, can be set in a defined manner. In addition, the initial force of the spring section is set by way of the prestress. This is favorably selected to be greater than 0, in order to make a complete restoring action possible. In particular, the restoring force has to be selected to be great enough to overcome any friction effects which occur, for example, in the case of the guidance of the brake lining with respect to the brake caliper.

It is proposed that the spring arm has an end section which bears with a prestressing face for the provision of a prestress against a prestressing face of the spring section or the lever arm.

Accordingly, the prestressing face of the end section bears against the corresponding prestressing face of the spring section or the lever arm, and ensures the corresponding prestress. Two variants for support of this type are explained in the design variants which are described in the following text.

In accordance with one favorable embodiment, the spring arm extends in a loop-shaped or j-shaped manner starting from the lever arm.

Said profiles represent particularly advantageous design variants for a spring section of this type. As an alternative, the spring arm can be configured in another way.

Furthermore, it is proposed that the spring arm engages with its end section into an opening of the lever arm.

Here, the opening provides a prestressing face which is prestressed with respect to the spring arm. The end region is particularly advantageously configured as a spring pin.

In another design variant, the spring arm engages with its end section around an end region of the lever arm.

The end section is supported on the end region of the lever arm in order to provide the prestress. The end section is particularly advantageously configured by way of a spring pin which provides a prestressing face. In particular, the end region of the lever arm provides a prestressing face which corresponds with the prestressing face of the spring section. The position of the end region on the lever arm is on the side of the spring section or is remote from the supporting section.

In one advantageous design variant, a spring travel of the spring arm is limited.

In particular, the limiting takes place by way of a stop. The stop limits the free movability of the spring section. The stop is favorably configured on the lever arm, on the spring section or on the spring element. The available spring travel determines the spacing between the friction lining and the brake disk. If the spring travel is used up, the wear adjustment means becomes active in the case of a further axial displacement of the brake lining by way of the brake actuator. Here, in particular, the lining carrier is displaced axially on the connecting element.

The spring arm of the spring section favorably has a contact face which corresponds with a contact face of the spring section or the lever arm, in order to limit the spring travel.

In particular, the spring section can be configured in one piece with the lever arm, or the spring section is provided by way of a separate spring element which is fastened to the lever arm. The contact faces provide the contact region of the stop. In particular, the contact faces are configured in such a way that burrowing of the materials into one another is ideally avoided. This can be brought about by way of a flat configuration of the contact faces. As a result, the provided spring travel and therefore also the basic position of the brake lining remain unchanged for the entire service life.

The spring arm advantageously has a bearing face which is in bearing contact with a bearing face of the brake support body.

Said bearing face serves for support with respect to the brake support body in the case of a braking operation and in the case of the restoring action of the brake linings. In particular, the bearing face of the spring arm is of flat configuration. The comments with respect to the supporting faces also apply analogously to the bearing faces.

BRIEF DESCRIPTION OF THE DRAWINGS

The brake apparatus will be described in the further text in detail and by way of example on the basis of a plurality of figures, in which:

FIG. 9 shows a restoring apparatus in accordance with the brake apparatus according to FIG. 8, and FIG. 10 shows a lever arm for a restoring apparatus according to FIG. 9.

DETAILED DESCRIPTION

Figure 4:
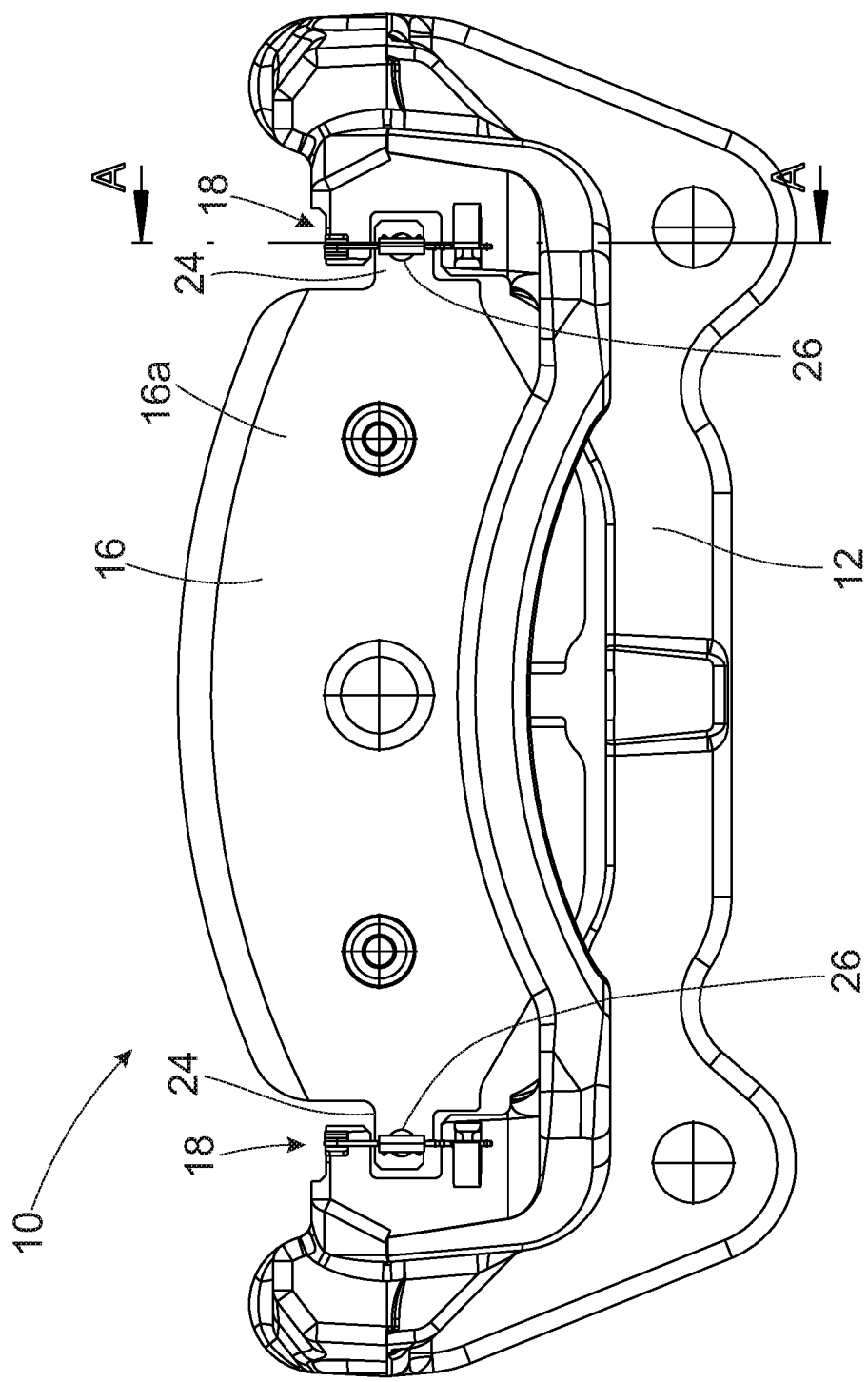
FIG. 4 shows a partial illustration of the brake apparatus from FIG. 1 in a side view.

FIGS. 1-4 show a plurality of illustrations of a brake apparatus 10. In particular, the illustration in FIG. 4 is a partial illustration of the brake apparatus from FIG. 1. The brake apparatus 10 is a brake caliper of a disk brake, which brake caliper is mounted in a floating manner. The brake disk is not shown in FIGS. 1-4.

The brake apparatus 10 comprises a brake support body 12, a brake actuator 14, a set of brake linings 16, a restoring apparatus 18 and a wear compensation means 20. In the case of the floating caliper brake which is described here, the brake support body 12 is configured as a brake carrier 12. In the case of a fixed caliper brake, the brake support body is configured by way of a single-piece or multiple-piece fixed caliper.

The brake carrier 12 is configured for fastening to a suspension system of a motor vehicle, and serves to receive the further components of the brake apparatus 10. In particular, the brake actuator 14 is arranged on the brake carrier 12. The brake actuator 14 receives the two brake linings 16, between which a brake disk is arranged. Depending on the state of the brake actuator 14, the brake disk can rotate freely, or is braked or held fixedly via a friction force. The clearance between the brake linings 16 for arranging the brake disk can be seen clearly in FIGS. 2b and 2c.

In order to provide a braking operation, the brake actuator is actuated in the case of a rotating brake disk, with the result that the brake linings 16 are moved toward one another and toward the brake disk in the axial direction. The brake linings 16 then come into frictional bearing contact with the rotating brake disk and provide a brake torque. Said brake torque is transmitted via the brake carrier 12 to the suspension system. The brake disk and the wheel which is connected to the brake disk are braked or held fixedly in this way. As a result, a vehicle, on which the brake apparatus 10 is configured, is slowed down. A vehicle of this type can be, for example, a passenger car, a truck or else a motorcycle. At the end of the braking operation, the actuation force of the brake actuator 14 is decreased, with the result that the restoring apparatus 18 moves the brake linings 16 via the provided restoring force into their basic position.

Figure 1:
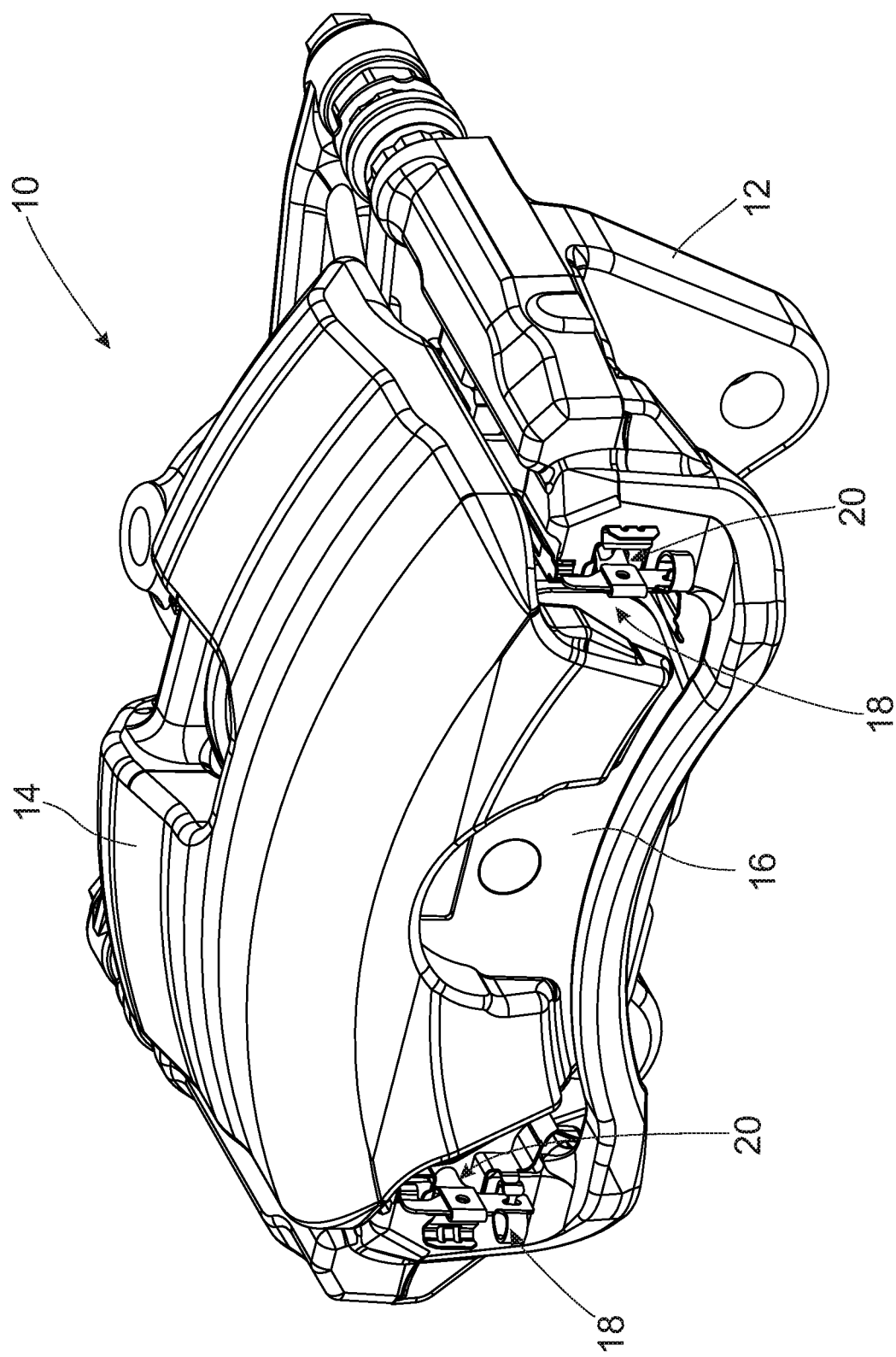
FIG. 1 shows a perspective illustration of the brake apparatus.
Figure 2A:
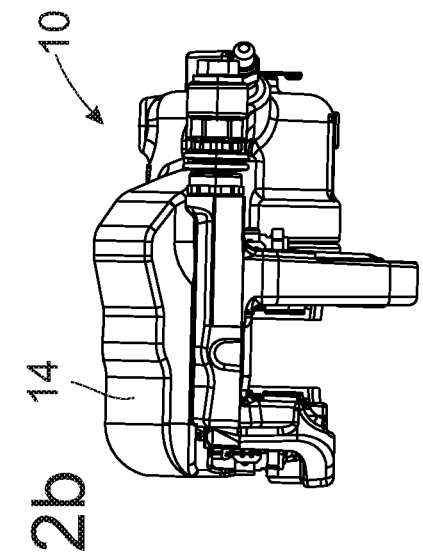
FIG. 2a shows a plan view of the brake apparatus from FIG. 1.
Figure 2B:
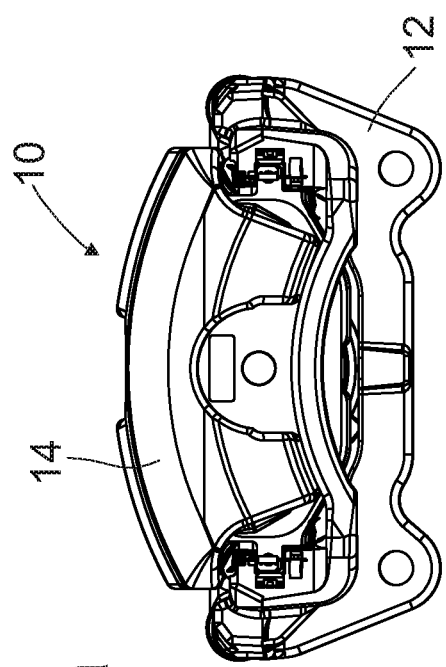
FIG. 2b shows a side view of the brake apparatus from FIG. 1.
Figure 2C:
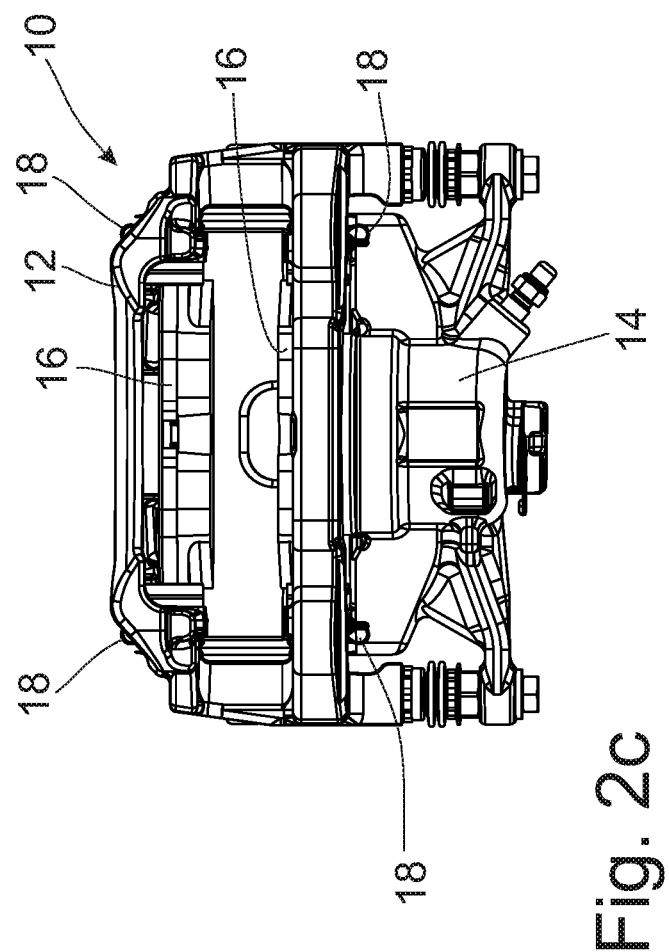
FIG. 2c shows a bottom view of the brake apparatus from FIG. 1.
Figure 3B:
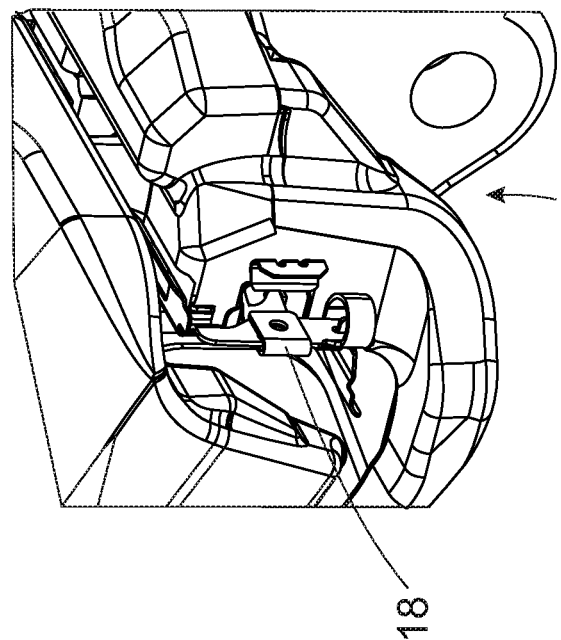
FIG. 3b shows a second enlarged partial illustration of the brake apparatus from FIG. 1.
Figure 3A:
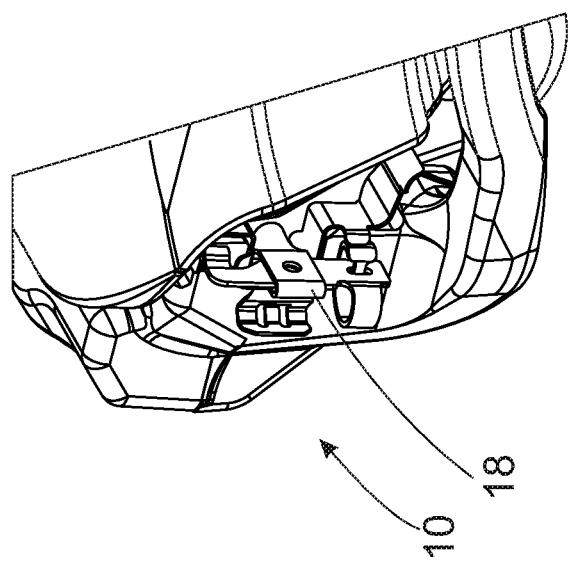
FIG. 3a shows a first enlarged partial illustration of the brake apparatus from FIG. 1.

FIG. 2c shows four restoring apparatuses 18 per brake caliper and therefore two restoring apparatuses per brake lining 16. As a result, a homogeneous restoring action of the brake linings 16 is made possible. In the rest state of the brake apparatus, the restoring apparatuses 18 ensure a defined air gap between the brake disk and the brake linings 16, with the result that there is no bearing contact.

The wear compensation means 20 which is configured on each restoring apparatus 18 provides an adjustment in the case of increasing wear of the brake linings 16, with the result that the spacing between the brake lining 16 and the brake disk remains at the originally defined extent. As a result, a long approach travel of the brake linings to the brake disk is firstly prevented, and a bearing contact between the brake lining and the brake disk is secondly prevented.

Figure 5A:
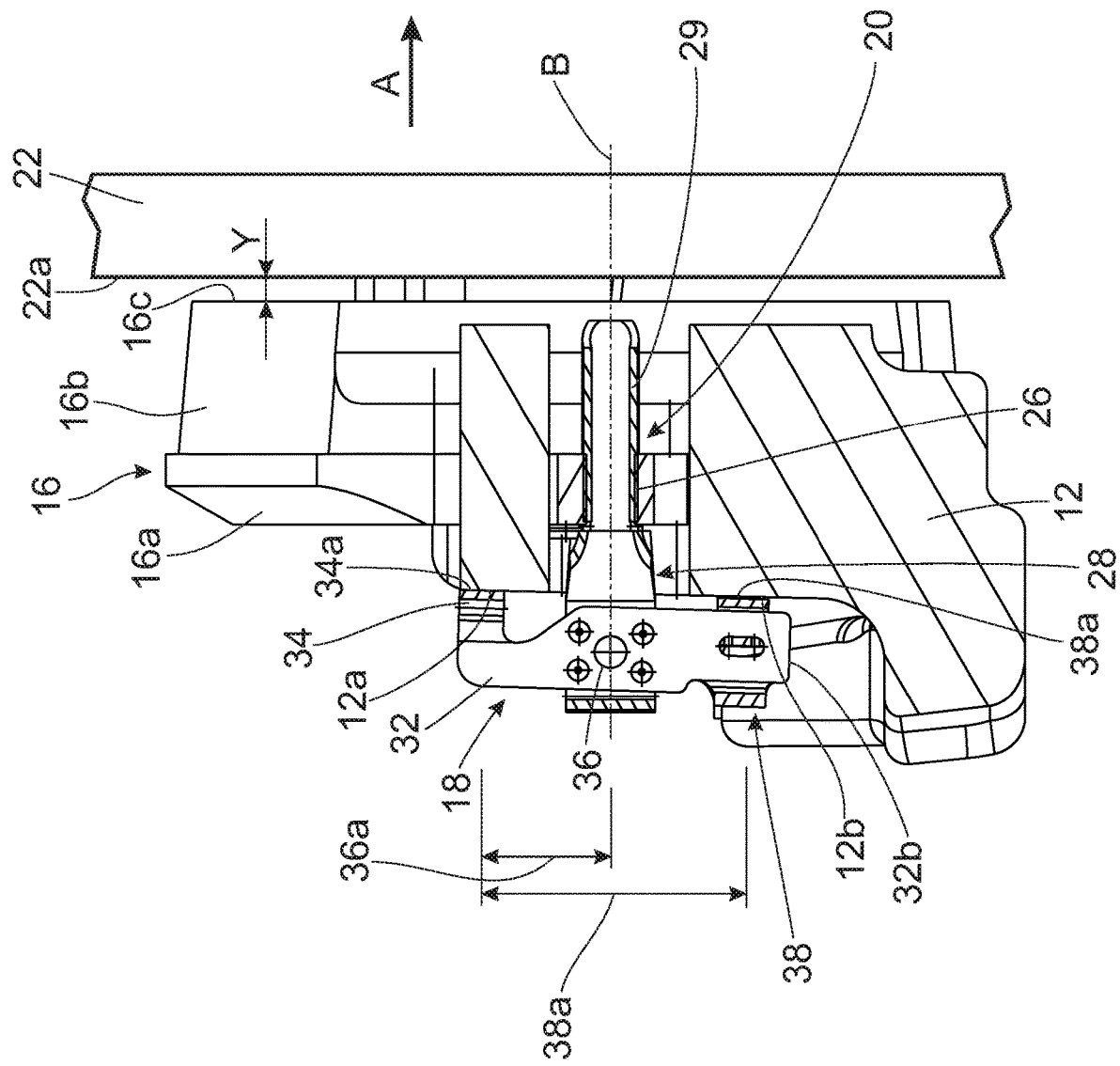
FIG. 5a shows a sectional view of the brake apparatus with an illustration of the restoring apparatus in a new state.

FIG. 4 shows a sectional line AA, the cross section of which can be seen in FIGS. 5a and b. FIG. 5a represents the new state of the brake apparatus 10 with new brake linings 16, the brake linings 16 being partially worn according to FIG. 5b. FIGS. 5a and b show the brake disk 22. The brake lining 16 is constructed by way of a lining carrier 16a, on which the brake actuator acts, and by way of a friction lining 16b which comes into bearing contact with the brake disk 22 in the case of a braking operation. The lining carrier 16a and the friction lining 16b are connected to one another fixedly.

As shown in FIG. 4, the lining carrier 16a has lining lugs 24 which, inter alia, serve to guide the brake lining 16 with respect to the brake carrier 12. An opening 26 is configured on the lining lugs 24, into which opening 26 a connecting element 28 engages, the engagement taking place by way of a pin 29 which is part of the connecting element 28. The pin 29 of the connecting element 28 is configured as a hollow pin with a slot 30. The connecting element 28 is shown once again in FIG. 6a, the connecting element being part of the restoring apparatus 18.

The diameter of the pin 29 of the connecting element 28 has an oversize with respect to the diameter of the opening 26. A certain elasticity is provided by way of the sheet-shaped construction and the slot 30 of the pin 29. As a result, the connecting element 28 can engage into the opening 26 with a smaller diameter. In particular, the hollow pin is compressed elastically and, as a result, provides a frictionally locking connection to the brake lining 16.

Figure 6B:
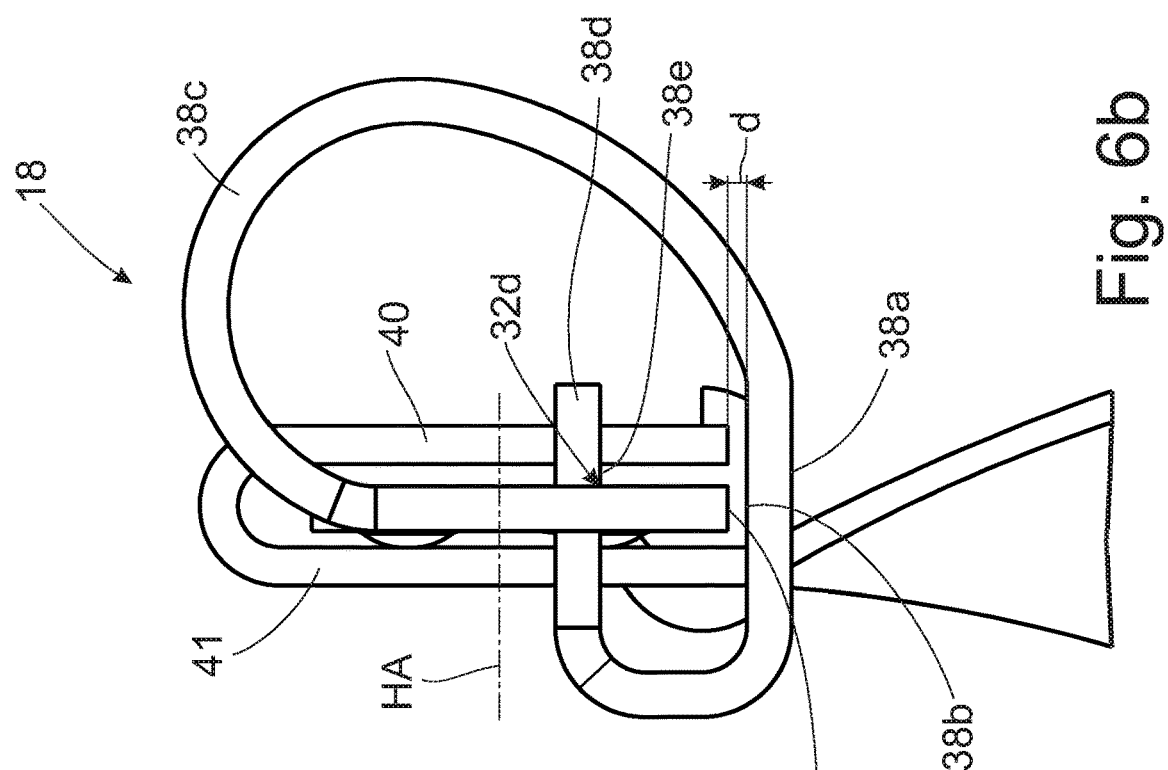
FIG. 6b shows a second view of the restoring apparatus.
Figure 6A:
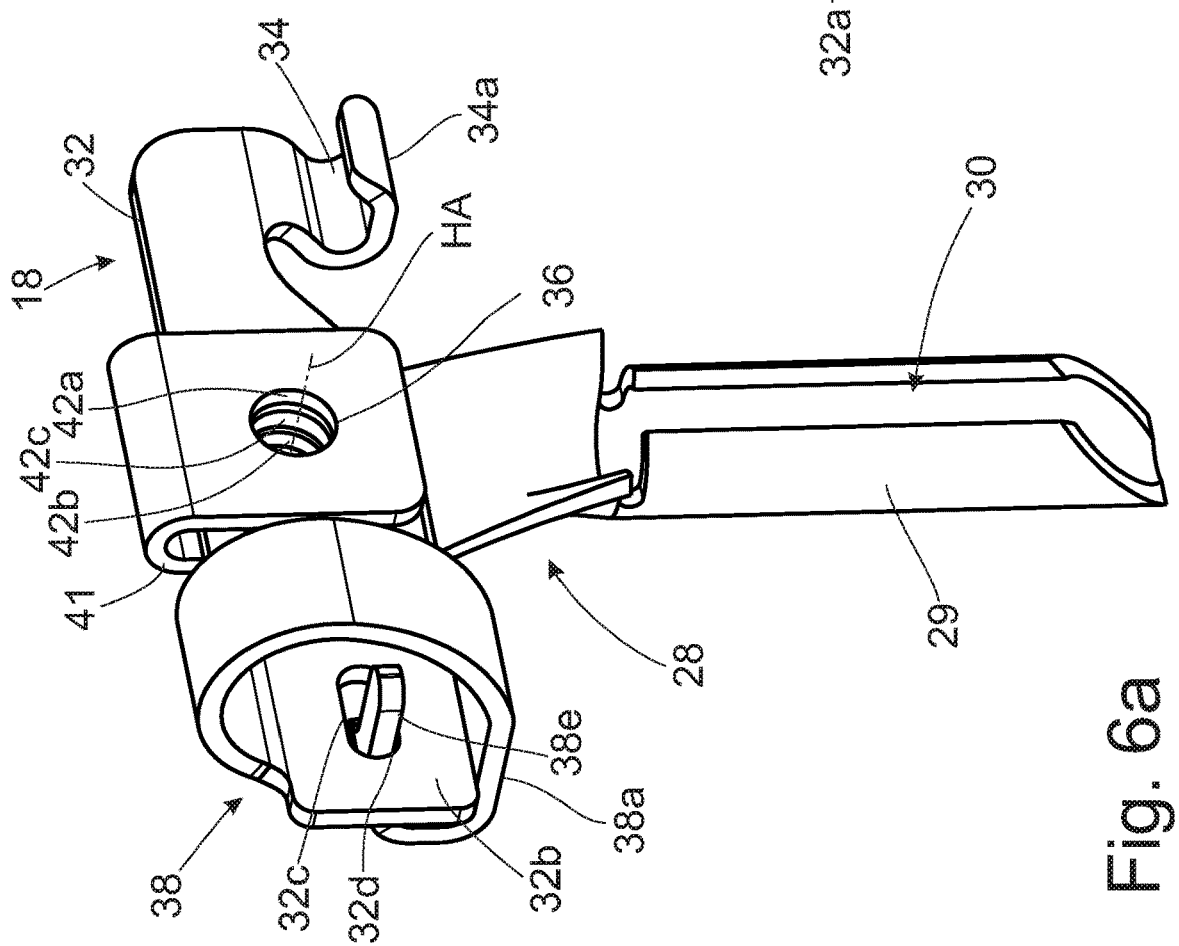
FIG. 6a shows a first view of the restoring apparatus.

In addition to the connecting element 28, the restoring apparatus 18 also comprises a lever arm 32. The lever arm 32 configures a supporting bearing 34, a lever bearing 36 and a spring section 38. The lever bearing is configured between the supporting bearing 34 and the spring section 38. As can be seen in FIG. 6a, the connecting element 28 is connected at the lever bearing 36 to the lever arm 32.

In addition to the pin, a tab 40 is additionally configured in one piece on the connecting element 28. The connecting element therefore engages around the lever arm 32 on both sides. The tab 40, a center section 41 of the connecting element 28 and the lever arm 32 in each case have an opening 42a, b, c which correspond with one another. The lever bearing 36 of the lever arm 32 is configured by way of the opening. For fastening purposes, a fastening means, for example a rivet, engages into the openings 42a, b, c which correspond with one another. The fastening means is not shown in FIGS. 6a and 6b.

In the case of said fastening variant, the connecting element 28 is mounted such that it can be rotated about a lever axis HA, with the result that rotational movements of the lever arm 32 around the supporting bearing 34 with respect to the brake lining can be compensated for.

The supporting bearing 34 is configured on the lever arm by way of a C-shaped or L-shaped section. Said L-shaped section provides a planar supporting face 34a. As can be seen in FIG. 5a, the supporting face 34a comes into bearing contact with a corresponding supporting face 12a of the brake carrier 12, in order to be supported in the axial direction. The lever arm 32 which is configured as a sheet metal part provides a flat bearing contact with the single-piece shaped-out formation of the supporting bearing in a C-shape or L-shape. In particular, the flat surface contact is greater than is provided by way of the thickness of the sheet metal. Burrowing of the supporting bearing 34 into the brake carrier 12 is prevented by way of the flat configuration. In addition, the brake carriers are not machined on the region, on which the supporting bearing 34 acts, with the result that possible unevennesses or surface irregularities which can be due to the production method are compensated for. According to FIG. 5a, said supporting face 12a is advantageously configured parallel to a friction face 22a of the brake disk 22. In addition to the supporting function with respect to the brake carrier 12, the supporting bearing also provides a rotational point for the movement of the lever arm 32.

In relation to the supporting bearing 34, the spring section 38 is arranged at the opposite end of the lever arm 32. The construction and the precise method of operation of the spring section 38 will be described in even greater detail in the following text. The spring section provides a spring travel which is utilized in the case of an actuation of the brake apparatus in the axial direction A toward the brake disk 22.

The movement of the brake linings in the case of a braking operation is introduced via the connecting element 28 into the lever bearing 36 and therefore into the lever arm 32. The lever bearing therefore moves along the axis B in the direction A toward the brake disk 22. Here, the connecting element can carry out a rotational movement with respect to the lever arm 32.

In the case of the movement of the lever bearing 36, the lever arm 32 is supported firstly via the supporting bearing 34 on the brake carrier 12 and secondly via the spring section 38, likewise on the brake carrier 12. On account of its elasticity, the spring section 38 provides a spring travel d, with the result that the lever arm 32 can rotate about the supporting bearing and, as a result, can follow the movement of the brake lining in the direction A. At the end of the braking operation, the spring section 38 provides a restoring force on the brake lining by way of its spring force via the lever arm 32. The restoring force moves the brake lining back into its starting position or into the basic position again.

A sufficiently great force for the restoring action can be provided via the lever ratio with the lever length 36a for the lever bearing and 38a for the spring section 38. The spring section 38 provides a spring travel d which is converted into a brake spacing Y. The brake spacing corresponds to the spacing between the friction face 22a of the brake disk 22 and the friction face 16c of the friction lining 16b. At the end of the braking operation, accordingly, the spring travel d and also the brake travel Y are re-established.

The spring section 38 is configured in one piece with the lever arm 32. As an alternative, the spring section can also be configured as a spring element which is fastened to the lever arm 32. The same also applies to the supporting section 34.

The spring section 38 configures a contact face 38a which is in bearing contact with a corresponding contact face 12b of the brake carrier 12. The contact faces are likewise of flat configuration, just like the supporting faces. As a result, burrowing is prevented and reliable support is ensured. Therefore, an unchanged restoring action which provides a consistent brake spacing y is provided even in the case of a rising number of braking operations.

The brake lining is subject to wear with a rising number of braking operations and an increasing service life, with the result that the thickness of the friction lining 16b decreases. Said change in the thickness of the friction lining is compensated for by way of the wear compensation means 20 which is configured. The adjustment takes place as described in the further text.

The thickness of the friction lining 16b decreases on account of the wear. In the case of a further actuating operation of the brake actuator 14, the brake linings 16 are moved axially toward the brake disk 22. Merely a spring travel d is provided by way of the spring section, however. As soon as said spring travel is used up, the bearing face 38b of the spring section and the bearing face 32a of the lever arm 32 come into bearing contact and, as a result, form a stop. The spring travel d of the restoring apparatus is used up. As a result, a direct non-positive connection is established between the lever arm 32 and the brake carrier 12 via the bearing faces and the contact faces, with the result that a direct transmission of force takes place from the end region 32b of the lever arm 32 to the brake carrier 12. The lever arm 32 is deflected into its maximum position. On account of the wear, however, bearing contact does not yet take place between the friction lining 16b and the brake disk 22, for which reason the brake actuator 14 moves the friction linings further toward the brake disk 22. The force of the brake actuator 14 is sufficiently high to overcome the frictionally locking connection between the pin 29 and the opening 26. In this case, an axial displacement of the lining carrier 16a with respect to the pin 29 takes place. The friction lining 16 is therefore repositioned with respect to the restoring apparatus. The adjusting operation has been carried out. At the end of the braking operation, the restoring apparatus 18 sets a brake spacing y again in accordance with the spring travel d. The brake spacing y therefore always remains between the brake disk and the friction lining in the rest state of the brake lining 16 independently of the wear state of the friction lining. Therefore, the basic position of the friction lining remains unchanged over the entire service life.

Figure 5B:
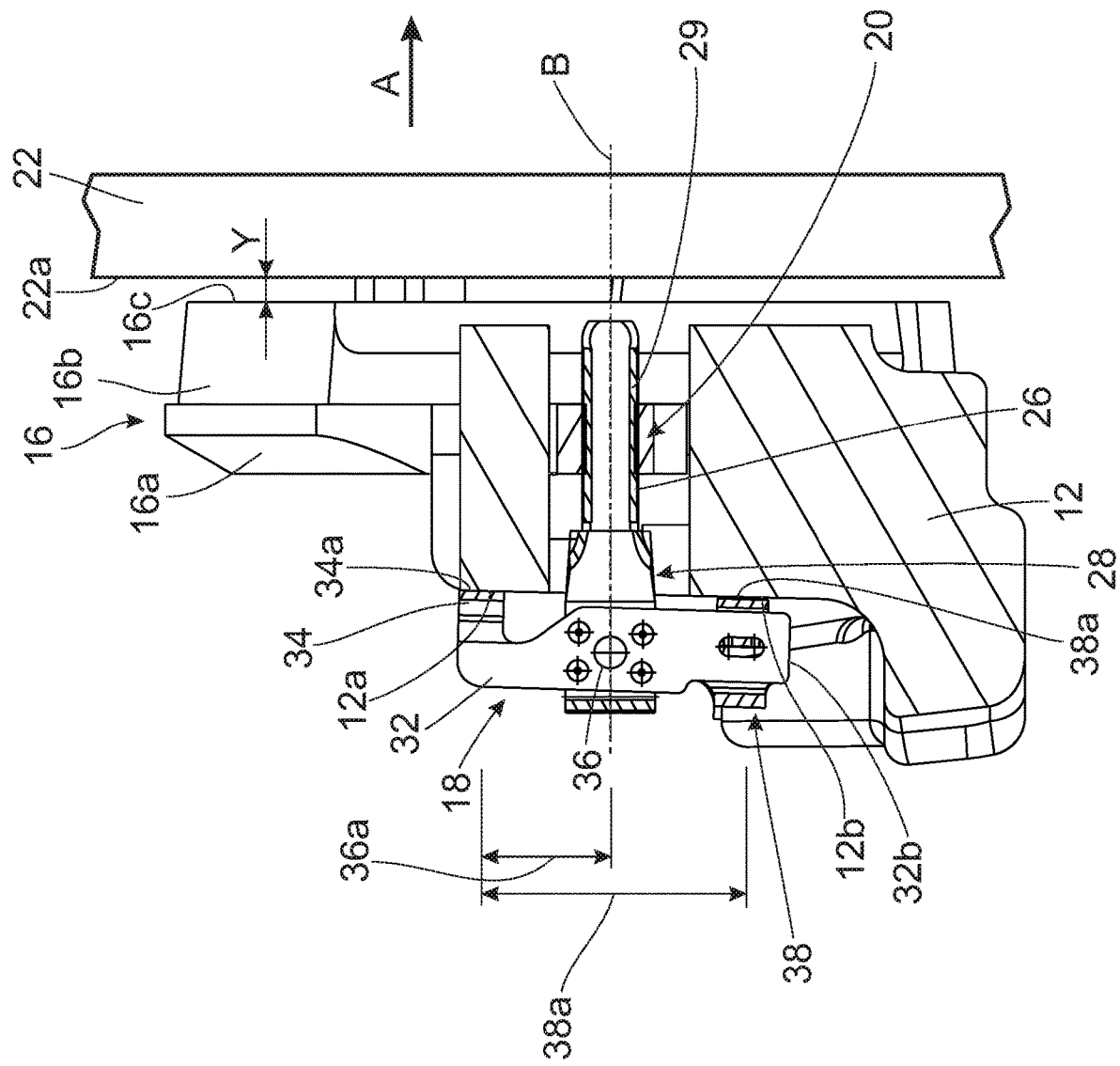
FIG. 5b shows figures shows a sectional view of the brake apparatus with an illustration of the restoring apparatus in a worn state.

FIG. 5b shows a state, in the case of which the friction lining 16 is already partially worn. It can be seen that the friction lining 16a has a different rest position on the pin 29 in comparison with FIG. 5a. The rest position of the friction lining therefore moves toward the brake disk during the service life, by the relative position of the lining carrier 16a with respect to the connecting element 28 changing depending on the wear state. The rest position is determined by way of the spacing of the lining carrier 16a from the brake disk in the rest state.

The connecting element 28 and the pin 29 are configured in such a way that they do not project beyond the friction face 16c of the friction lining 16b.

In the further text, the construction and the function of the spring section will be described in detail. The spring section is configured in one piece with the spring arm, and provides a loop-shaped construction in the cross section according to FIG. 6b. The spring section is configured by way of a spring arm 38c which extends starting from the end region 32b of the lever arm 32. The spring arm 38 extends once in a loop-shaped manner around the lever arm, the tongue-shaped end section 38d of said spring arm 38 engaging into an opening 32c of the end region 32b of the lever arm 32.

In cross section, the course of the spring arm is initially circular, the radius of curvature increasing. The curved face merges with a kink into a rectilinear region which provides, inter alia, the contact face 38a and the bearing face 38b. In the further course, the spring arm 38 has two 90 degree bends. The spring arm 38 ends with an end section 38d which is of tongue-shaped configuration and engages into the opening 32c of the lever arm 32.

The tongue 38d has a prestressing face 38e which interacts with a corresponding prestressing face 32d of the opening 32c. The prestressing faces are in bearing contact and are supported against one another, with the result that the spring section 38 provides a defined starting force.

The opening 32c is configured as a slot. Furthermore, the spring arm is curved in such a way that a spring prestress is provided by way of the engagement of the section 38d into the opening 32c. The spring section therefore already bears against the opening 32c under prestress. The provided initial force of the spring section is set to be greater than 0 as a result. A complete restoring action of the brake lining into the basic position is provided by way of the prestress and the initial force.

As a result of its sheet-shaped and upright construction, the lever arm 32 is of torsionally and flexurally rigid configuration in relation to the axial direction B, with the result that it provides substantially no elasticity. In the case of this design variant, the elasticity and the restoring force are provided exclusively by way of the spring section 38a. This also applies to the design variant, according to FIGS. 8 to 10, which will be described in greater detail in the following text.

Figure 7:
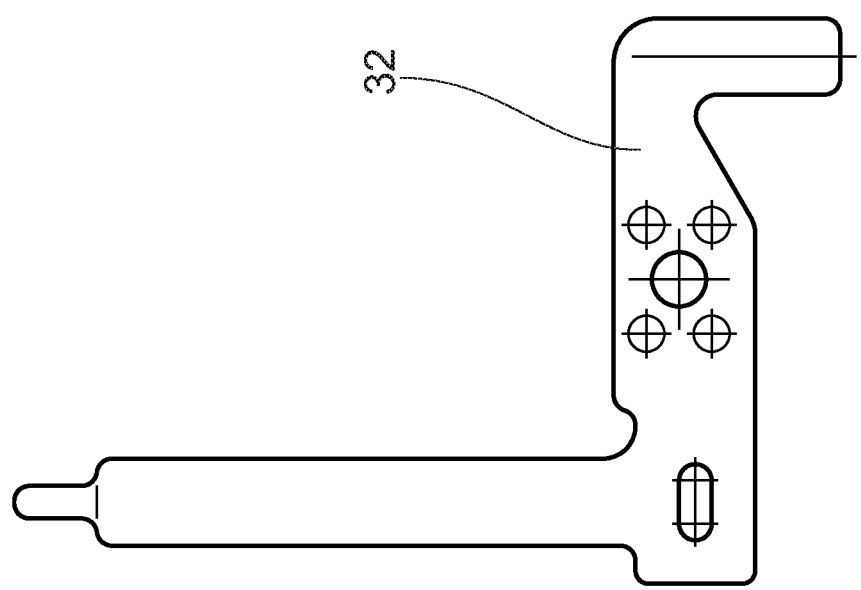
FIG. 7 shows a sheet metal part for producing a restoring apparatus according to FIGS. 6a and 6b.

The lever arm 32 and the connecting element 28 are configured as sheet metal parts of curved shape which are simple to produce. FIG. 7 shows the punched sheet metal part, from which the lever arm 32 is formed.

Figure 8:
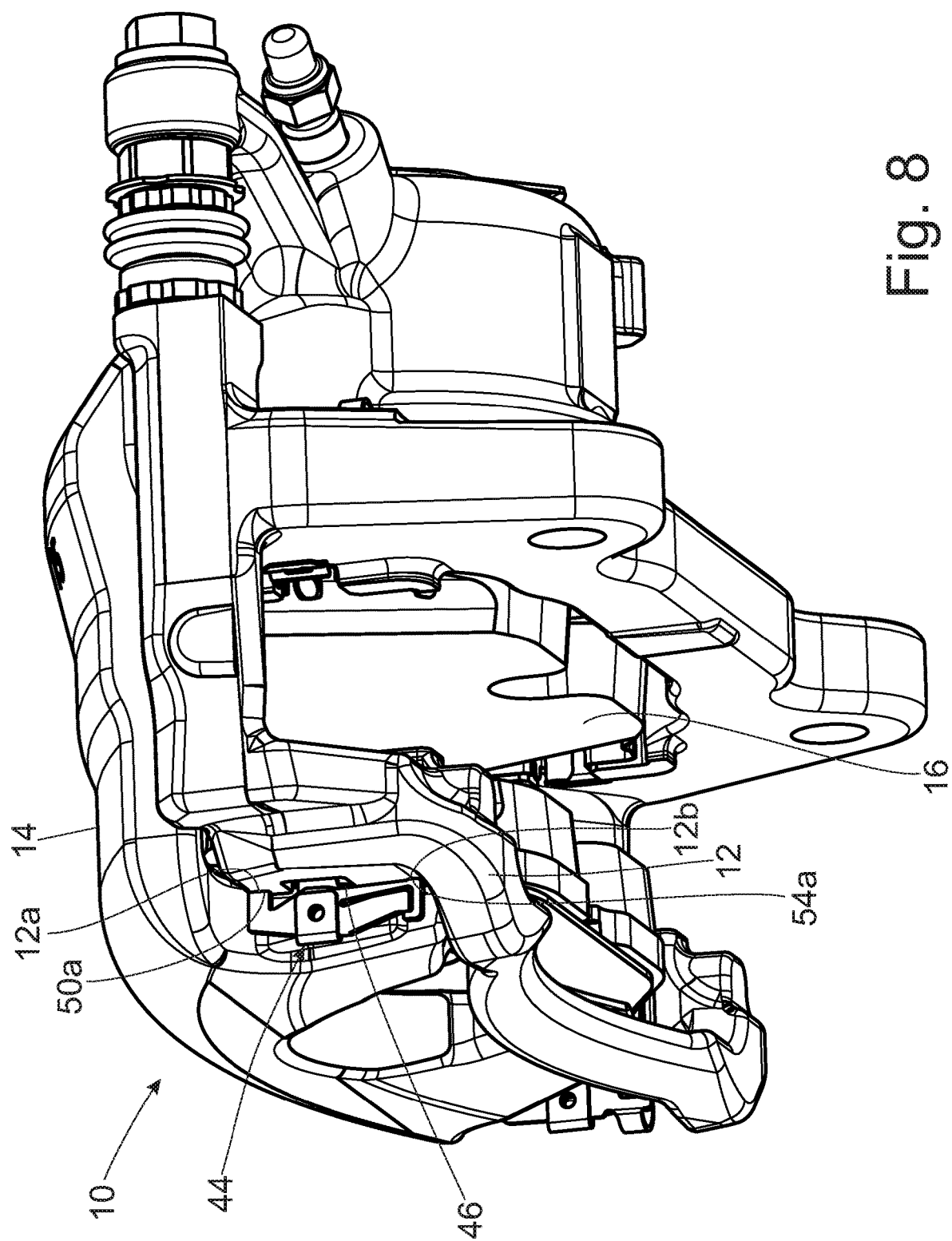
FIG. 8 shows a brake apparatus in a perspective illustration in a similar manner to the brake apparatus from FIG. 1 with another restoring apparatus.

FIG. 8 shows a further brake apparatus 10 which has an alternative design variant of the restoring apparatus. The construction and the method of operation correspond substantially to those of the brake apparatus 10 according to FIG. 1. In this regard, the designations are copied, in so far as no other construction or method of operation is derived.

The restoring apparatus 44 and, in particular, the lever arm 48 have a different construction. The lever arm 48 is shown in detail in FIGS. 9 and 10. The lever arm 48 configures a supporting bearing 50, a lever bearing 52 and a spring section 54. The supporting bearing 50, the lever bearing 52 and the spring section 54 provide the same functions as their counterparts of the lever arm 32.

Here, the supporting bearing 50 has a supporting face 50a which corresponds with the supporting face 12a of the brake carrier. The supporting face 50a is configured with a smaller area, in particular not flatly, in comparison with the supporting face 34a, however. The lever bearing 52 is of identical configuration to the lever bearing 36. The connecting element 56 likewise does not have any differences from the connecting element 28. The connecting element 56 configures a center section 57 and a tab 58, the openings 60a and 60b of which correspond with the opening 60c of the lever bearing 52 for receiving a fastening means.

The spring section 54 extends starting from a center part 48d of the lever arm 48, on which the lever bearing 52 is also configured. In particular, the spring arm 54c extends in a J-shaped manner starting from the center part 48d, the spring arm engaging around an end region 48b of the lever arm 48. A tongue 54d which comes into bearing contact with the end region 48b is configured at the axial end of the spring arm 54c. The tongue is configured on the spring arm 54c such that it is angled away by approximately 90 degrees. The tongue 54d is configured to prestress the spring arm with respect to the end region 48b.

In addition, a bearing face 48a which can interact with a bearing face 54b of the spring arm 54c is configured on the end region 48b of the lever arm. The bearing faces come into bearing contact when the spring travel d is used up. The method of operation of the spring section 54 corresponds substantially to the method of operation of the spring section 38. Just like the lever arm 32, the lever arm 48 is configured to be so rigid that the elasticity is provided substantially by way of the spring section 54.

The tongue 54d has a prestressing face 54e which interacts with a corresponding prestressing face 48c of the end region 48b of the lever arm 48 in order to provide a starting force of greater than zero.

The further comments with respect to the restoring apparatus 18, the wear compensation means 20 and the lever arm 32 also apply analogously to the restoring apparatus, the wear compensation means and the lever arm 48 according to FIGS. 8 to 10.

What is claimed is:

1. A brake apparatus for a motor vehicle, comprising:
    a brake support body, a brake lining, a restoring apparatus for the brake lining, and a wear compensation means,
    the restoring apparatus being connected via the wear compensation means to the brake lining,
    the restoring apparatus having a lever arm which comprises a spring section, a supporting bearing and a lever bearing, wherein the spring section includes an end section which has a prestressing face for the provision of a prestress against a corresponding prestressing face of the lever arm, and
    the lever bearing being arranged between the spring section and the supporting bearing.

2. The brake apparatus as defined in claim 1, wherein the restoring apparatus has a connecting element which engages into an opening of the brake lining and configured the frictionally locking connection as a result.

3. The brake apparatus as defined in claim 1, wherein the lever arm is of flexurally stiff configuration.

4. The brake apparatus as defined in claim 1, wherein the restoring apparatus is of two-piece configuration and has a connecting element which is fastened to the lever arm.

5. The brake apparatus as defined in claim 1, wherein the spring section has a spring arm which provides a spring force for a restoring action of the brake lining.

6. The brake apparatus as defined in claim 5, wherein the spring arm is prestressed.

7. The brake apparatus as defined in claim 5, wherein the spring arm engages with its end section around an end region of the lever arm.

8. The brake apparatus as defined in claim 5, wherein a spring travel of the spring arm is limited by way of a stop.

9. The brake apparatus as defined in claim 1, wherein the corresponding prestressing face of the lever arm defines an opening.

10. The brake apparatus as defined in claim 1, wherein the spring section engages the brake support body and includes a bearing face spaced from a bearing face of the lever arm by a travel distance, and wherein the bearing faces are brought into engagement with one another in response to a braking operation to allow the brake lining to move along the wear compensation member.

11. A brake apparatus for a motor vehicle, comprising:
    a brake support body;
    a brake lining;
    a restoring apparatus for the brake lining including:
        a lever arm comprising a bearing face;
        a spring section having a corresponding bearing face and extending from the lever arm and engaging the brake support body;
        a supporting bearing extending from the lever arm; and
        a lever bearing arranged between the spring section and the supporting bearing; and
    a wear compensation member connecting the restoring apparatus to the brake lining, wherein the bearing faces are brought into engagement with one another in response to a braking operation to allow the brake lining to move along the wear compensation member.

* * * * *